United States Patent
Nakama et al.

(12) 
(10) Patent No.: US 6,753,064 B1
(45) Date of Patent: Jun. 22, 2004

(54) MULTI-LAYERED COATED SUBSTRATE AND METHOD OF PRODUCTION THEREOF

(75) Inventors: Kenichi Nakama, Osaka (JP); Katsuhide Shimmo, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/529,990

(22) PCT Filed: Aug. 27, 1998

(86) PCT No.: PCT/JP98/03817
§ 371 (c)(1), (2), (4) Date: Apr. 24, 2000

(87) PCT Pub. No.: WO99/21711
PCT Pub. Date: May 6, 1999

(30) Foreign Application Priority Data

Oct. 24, 1997 (JP) ............................................. 9-292780

(51) Int. Cl.[7] ................................................. G02B 1/10
(52) U.S. Cl. ....................... 428/156; 428/161; 359/577; 359/580; 359/601
(58) Field of Search .................................. 428/156, 161, 428/141, 142; 359/601, 611, 613, 577, 580, 581, 586

(56) References Cited

U.S. PATENT DOCUMENTS

| | | | | |
|---|---|---|---|---|
| 5,212,596 A | * | 5/1993 | Andrus | 359/529 |
| 5,377,044 A | * | 12/1994 | Tomono et al. | 359/566 |
| 6,207,263 B1 | * | 3/2001 | Takematsu et al. | 428/142 |

FOREIGN PATENT DOCUMENTS

JP      4-47541      2/1992      ............ G11B/7/26

* cited by examiner

Primary Examiner—Sandra M. Nolan
Assistant Examiner—Alicia Chevalier
(74) Attorney, Agent, or Firm—Sughrue Mion, PLLC

(57) ABSTRACT

The invention provides a multilayer-coated substrate which has recesses and projections of an accurate shape on the surface and has high heat resistance and a high degree of integration, and further provides a process for producing the same.

14 Claims, 5 Drawing Sheets

MULTI-LAYERED COATED SUBSTRATE AND METHOD OF PRODUCTION THEREOF

TECHNICAL FIELD

The present invention relates to a multilayer-coated substrate for use as an information recording medium utilizing magnetism or light or as an optical part for optical communication, etc., and to a process for producing the same. More particularly, the invention relates to a multilayer-coated substrate for use as an information recording medium, such as a CD-ROM, or as an optical part, such as planar microlenses or a grating element, and a process for producing the same.

BACKGROUND ART

Information recording media such as CD-ROMs and optical parts such as planar microlenses or grating elements should have minute projections on the surface thereof. These minute surface projections function as pits or tracking guides in the information recording media. In the optical parts, the surface projections converge or diffuse light to function as microlenses or a diffraction grating.

A technique for forming these surface projections is known which comprises evenly spreading an ultraviolet-curable resin on a substrate and irradiating the resin with ultraviolet while pressing the resin with a die having recesses (Unexamined Published Japanese Patent Application No. 63-49702).

In Unexamined Published Japanese Patent Applications Nos. 62-102445 and 6-242303 is described a process for production by the so-called sol-gel method, which comprises applying a solution containing a silicon alkoxide on a glass substrate and heating the applied solution while pressing a die having recesses against the same to thereby form projections.

Furthermore, Unexamined Published Japanese Patent Application No. 63-197382 describes a technique in which an ultraviolet-curable resin is evenly spread on a substrate and projections are formed thereon by reactive ion beam etching using as a mask a pattern formed with a photoresist.

However, the conventional techniques described above have had the following problems. First, the ultraviolet-cured resin has low heat resistance and decomposes or yellows when heated to 250° C. or higher. Consequently, the substrates having projections made of the ultraviolet-cured resin are incapable of heat processing such as soldering and it has been difficult to attach the substrates to apparatus, etc.

In contrast, the silicon alkoxide projections formed by the sol-gel method have high heat resistance and are capable of soldering, etc. However, the sol-gel method has had a problem that a thick film cannot be formed. When a silicon alkoxide layer of tens of micrometers is actually formed by the sol-gel method, the surface thereof develops minute cracks (hereinafter referred to as cracks). This is because as the silicon alkoxide solution gels and solidifies, the layer comes to have a difference in the progress of condensation polymerization reaction between the surface and an inner part thereof and, hence, a high stress generates on the surface. There have even been cases where the layer peels off the substrate due to the stress.

The technique of forming projections by reactive ion beam etching has had problems that the production steps are complicated, resulting in an increased production cost, and that it is difficult to improve evenness of the projections. Still another problem is that because of these, it is difficult to form a layer having a large surface area.

The invention has been achieved in view of the problems encountered in such conventional techniques. An object thereof is to provide multilayer-coated substrates in which the coating has high heat resistance, neither develops cracks in its surface nor peels off the substrate even when thick, and has a layer having uniform projections even when having a large area. Another object is to provide processes for producing these multilayer-coated substrates easily at low cost.

DISCLOSURE OF THE INVENTION

These objects have been accomplished with the following multilayer-coated substrates of the invention and the following processes for producing the same.

1. A multilayer-coated substrate comprising a substrate and united therewith two or more superposed layers which comprise an organopolysiloxane and the outermost layer of which has projections, the projections having a dispersion of height of 1 $\mu$m or less.
2. The multilayer-coated substrate described in item 1 above wherein the projections of the outermost layer have at least one sectional shape selected from the group consisting of a circular arc, an elliptic arc, and an angle.
3. The multilayer-coated substrate described in item 1 or 2 above wherein a lower layer also has projections conforming to the projections of the outermost layer.
4. The multilayer-coated substrate described in any one of items 1 to 3 above wherein in the two or more layers, the ratio of the thickness of the thickest layer to that of the thinnest layer is from 1 to 5.
5. The multilayer-coated substrate described in any one of items 1 to 4 above wherein in the two or more layers, the coefficients of linear expansion of the respective layers change gradationally from the substrate toward the outermost layer.
6. The multilayer-coated substrate described in any one of items 1 to 5 above wherein the two or more layers are two layers.
7. The multilayer-coated substrate described in any one of items 1 to 6 above wherein the substrate is a transparent body.
8. The multilayer-coated substrate described in item 7 above wherein the two or more layers gradationally change in refractive index from the substrate toward the outermost layer.
9. The multilayer-coated substrate described in item 7 or 8 above wherein the two or more layers satisfy the relationship $$t_x/n_x = \lambda/4$$

wherein $t_x$ is the thickness of an arbitrary layer, $n_x$ is the refractive index thereof, and $\lambda$ is the wavelength of the transmitted light.
10. The multilayer-coated substrate described in item 9 above wherein the two or more layers satisfy the relationship $$n_a/n_b = \sqrt{(n_s/n_o)}$$

wherein $n_o$ is the refractive index of the outermost layer, $n_b$ is the refractive index of an intermediate layer, $n_a$ is the refractive index of the innermost layer, and $n_s$ is the refractive index of the substrate.
11. The multilayer-coated substrate described in item 9 or 10 above wherein the transmitted light has a wavelength of from 380 to 2,000 nm.

12. The multilayer-coated substrate described in anyone of items 1 to 10 above wherein in the two or more layers, the outermost layer has been formed from methyltriethoxysilane and a lower layer has been formed from methyltriethoxysilane or tetraethoxysilane.

13. A process for producing a multilayer-coated substrate which comprises pouring a solution of the organopolysiloxane on a substrate and into molds, separately causing the solution layers to gel, subsequently superposing these gels on the substrate, and uniting the superposed gel layers with the substrate while pressing the gels with the mold for the outermost layer.

14. The process for producing a multilayer-coated substrate described in item 13 above wherein the mold for an arbitrary layer is one with which the layer is made to have the shape as described in item 2 or 3 above.

15. The process for producing a multilayer-coated substrate as described in item 13 or 14 above wherein the temperature at which the organopolysiloxane solution is caused to gel is from 20 to 120° C. and the temperature at which the superposed gel layers are united with the substrate thereafter is from 50 to 150° C.

16. The process for producing a multilayer-coated substrate as described in any one of items 13 to 15 above wherein the gels to be superposed have a viscosity of from $1 \times 10^4$ to $1 \times 10^6$ P.

BRIEF DESCRIPTION OF THE DRAWINGS

FIG. 4 (c) is a diagrammatic view illustrating the state in which a solution of an organopolysiloxane has been applied to a spherical mold. In the figure, 31 denotes a spherical mold (mold for an outermost layer), 13 an outermost layer having projections of a semi-cylindrical shape, and D the thickest part of the solution poured into the mold.

BEST MODES FOR CARRYING OUT THE INVENTION

Figure 1A:
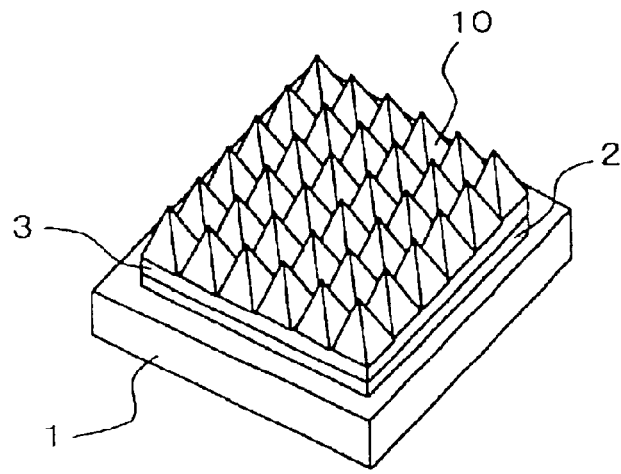
FIG. 1(a) is a slant view of a multilayer coated substrate in which the outermost layer has projections of a conical angle shape.

Embodiments of the invention will be explained below in detail.

In the invention, two or more layers are superposed on a substrate and united with the substrate, and projections are formed on the outermost layer. The projections have a reduced dispersion of height and exceedingly high uniformity. This high uniformity of the projections applies not only to the height but to the whole shape. Namely, the projections are highly uniform also in width and length. Furthermore, the layers are highly even also with respect to the internal stress generating in the projections and in the layers or to component concentration. Consequently, the substrate united with the layers, i.e., the multilayer-coated substrate, exhibits exceedingly high performances in respective applications. Namely, this multilayer-coated substrate can be a planar microlens array which comprises many microlenses having uniformity in performance and has exceedingly high accuracy. Alternatively, it can be a diffraction grating having exceedingly high resolving power.

Among the layers, the outermost layer means the surface layer located farthest from the substrate, while a lower layer means any layer other than the outermost layer. The lower layers are composed of the innermost layer, which is in contact with the substrate, and the other intermediate layer (s).

This multilayer-coated substrate is formed by the sol-gel method. In forming the layers, solutions each containing an organopolysiloxane are separately poured into respective molds, and the solutions are provisionally molded by heating or depressurization to thereby come into a gel state. In this procedure, the solution for forming an innermost layer may be directly poured onto a substrate. Subsequently, the gel-state layers are released from the molds and superposed on a substrate. The superposed gels are then heated, while being pressed against the substrate with the mold for the outermost layer, and are thus united with the substrate.

By heating these superposed gels on the substrate, the condensation polymerization of the organopolysiloxane is completed. Namely, the gels completely solidify to form a multilayer-coated substrate. By pressing the superposed gels against the substrate with the mold for the outermost layer during the reheating, the surface shape of the mold can be transferred to the outermost layer. Consequently, the surface shape of the mold is wholly copied on the outermost layer. The shape of the projections of the outermost layer can be regulated variously by modifying the surface shape of the mold.

A feature of the invention resides in that the sol-gel method is used to separately mold layers provisionally to a gel state and then superpose the layers on each other to produce a multilayer-coated substrate. A process for producing a multilayer-coated substrate by the sol-gel method has conventionally been known (Unexamined Published Japanese Patent Application No. 6-242303). However, in the conventional process, a solution or sol of one or more ingredients for constituting a layer is spread on a substrate and the spread solution or sol is heated while being pressed with a die to thereby form the layer at a time. Thereafter, another solution or sol is poured onto the completely solidified layer to form an upper layer.

Such a process in which layers are successively formed has been unsuitable for practical production because it necessitates prolonged production steps and this is causative of a cost increase. Furthermore, since the next layer is poured after the lower layer has completely cured in this process, unnecessary air inclusion has been apt to occur between the die and the solution or sol, resulting in a multilayer-coated substrate whose dimensional accuracy is not high.

Figure 3:
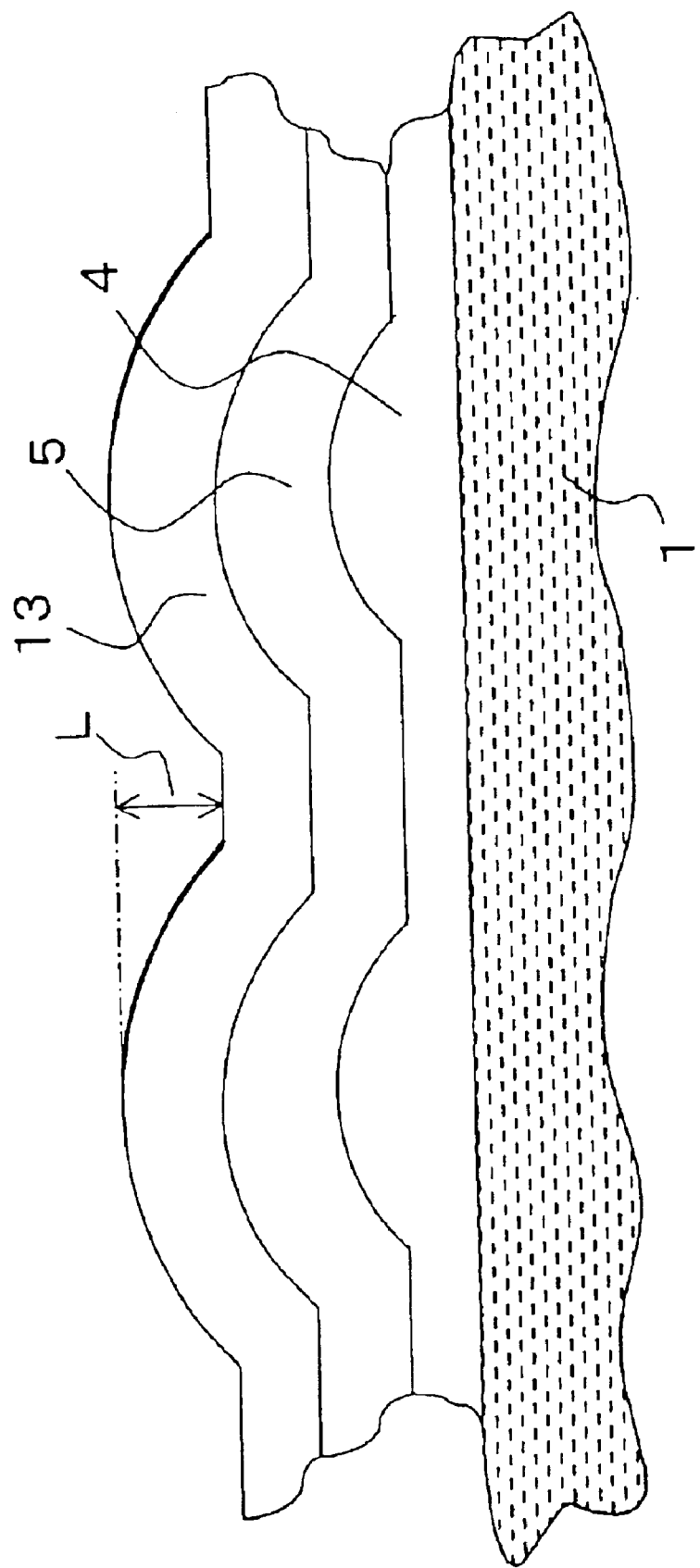
FIG. 3 is a sectional view of an important part of a multilayer-coated substrate in which the outermost layer has projections of a semi-cylindrical shape. In the figure, 1 denotes a glass plate, 4 an innermost layer, 5 an intermediate layer, and 13 an outermost layer having projections of a semi-cylindrical shape, and L is the height of the projection.

In contrast, in the invention, the steps for producing a multilayer-coated substrate are short and the multilayer-coated substrate has exceedingly high dimensional accuracy, because layers in a gel state are superposed. Specifically, the dispersion of height of the projections of the outermost layer according to the invention is 1 $\mu$m or less. The term height of the projections of an outermost layer means the distance L shown in FIG. 3.

Figure 1B:
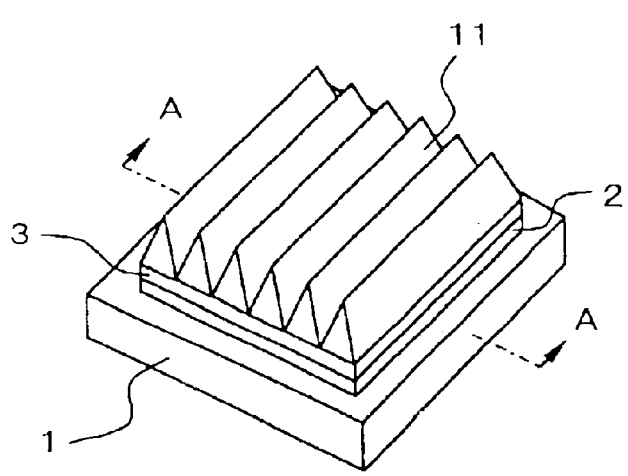
FIG. 1(b) is a slant view of a multilayer-coated substrate in which the outermost layer has projections of a columnar angle shape.
Figure 2A:
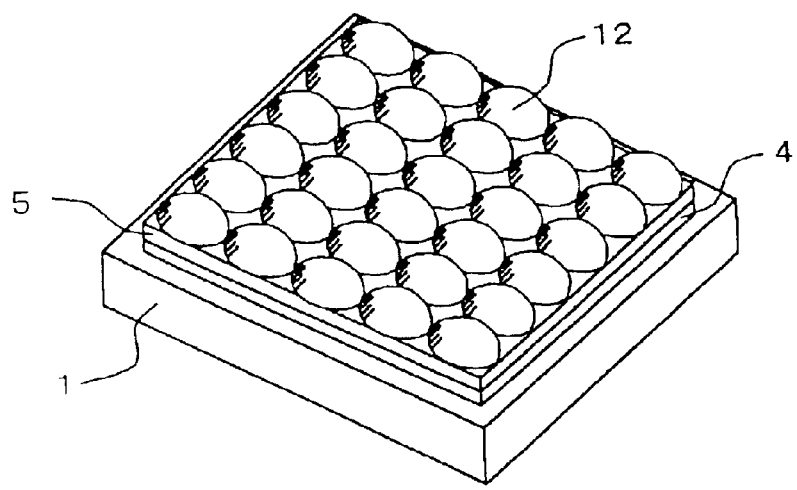
FIG. 2(a) is a slant view of a multilayer-coated substrate in which the outermost layer has projections of a semispherical shape.
Figure 2B:
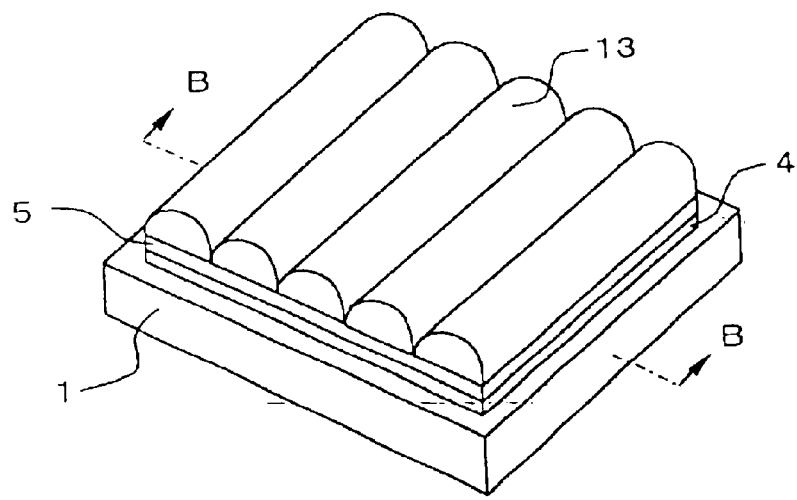
FIG. 2(b) is a slant view of a multilayer-coated substrate in which the outermost layer has projections of a semi-cylindrical shape.

The projections of the outermost layer preferably have, in a section of the layer, at least one shape selected from the group consisting of a circular arc, an elliptic arc; and an angle. The projections having a circular arc or elliptic arc shape in a section of the layer include semispherical protrusions arranged on an outermost layer as shown in FIG. 2(a) and semi-cylindrical projections such as those shown in FIG. 2(b). The projections having an angle shape in a section of the layer include conical projections such as those shown in FIG. 1(a) and columnar projections such as those shown in FIG. 1(b).

By varying the shape of the projections of the outermost layer, various functions can be imparted to the multilayer-coated substrate. For example, in the case where the multilayer-coated substrate is used as an optical part, the projections described in FIG. 2(a) or (b) are formed, whereby the function of a planar microlens array can be imparted thereto. Likewise, by forming projections of the shape described in FIG. 1(a) or (b), the function of a grating lens can be imparted to the multilayer-coated substrate. The shape of the projections of the outermost layer can be modified in such a manner according to the purposes. The multilayer-coated substrate of the invention can accomplish these purposes to a high degree.

Although the sol-gel method is used for producing the multilayer-coated substrate as described above, features of the sol-gel method include difficulties in forming a thick layer. This is attributable to the fact that as the layer thickness increases, the difference between the surface and an inner part of the layer in the progress of condensation polymerization reaction is apt to become large. Namely, in the sol-gel method, the layer undergoes the successive changes: solution→sol→gel→solid, as the condensation polymerization reaction of the metal alkoxide proceeds. Water generates with the progress of the condensation polymerization reaction. When the layer is saturated with the water, the condensation polymerization reaction is less apt to proceed. The surface of the layer is capable of outward releasing the water generated by the condensation polymerization reaction and is hence less apt to be saturated with water, so that the condensation polymerization reaction is apt to proceed therein. In contrast, inner parts of the layer are apt to be saturated because the water which has been yielded by the condensation polymerization reaction resides therein. Namely, inner parts of the layer are less apt to solidify because the condensation polymerization reaction is less apt to proceed therein.

Consequently, even when the condensation polymerization reaction has not proceeded in inner parts of the layer, the surface of the layer can gel or solidify and, hence, a tensile stress generates in the layer surface. As a result, the surface of the layer is apt to crack. This tensile stress tends to become higher as the thickness of the layer increases. Because of this, a thick layer cannot be produced by the sol-gel method. When a 3 $\mu$m-thick layer of a tetraalkoxysilane is actually solidified directly from a sol by the sol gel method, the surface thereof cracks. When a 20 $\mu$m-thick layer of a methyl trialkoxysilane is solidified directly from a sol, the surface thereof cracks.

In case where the projections of the outermost layer can be enlarged, a new feature can be imparted to the multilayer-coated substrate. For example, in the case where the multilayer-coated substrate is utilized as a lens array, the focal distance can be shortened. In the case where it is utilized as a grating element, an echelle or echellette grating having a coarse periodic structure can be produced. In the case where the multilayer-coated substrate is utilized as an information recording medium, the function of multilayer recording can be imparted.

Figure 1C:
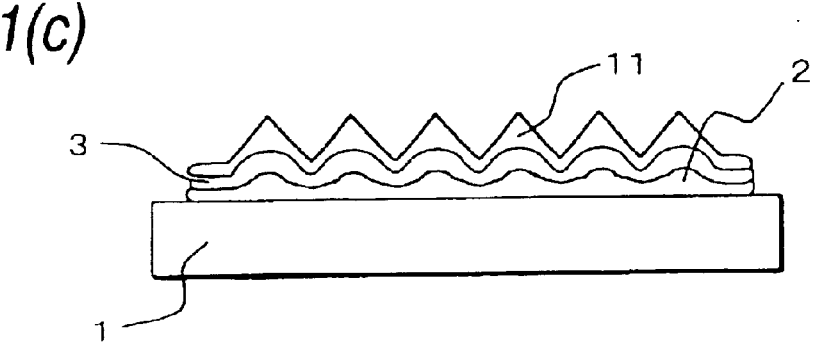
FIG. 1(c) is a sectional view taken on the chain line A—A. In these figures, 1 denotes a glass plate, 2 an innermost layer, 3 an intermediate layer, 10 an outermost layer having projections of a conical angle shape, and 11 an outermost layer having projections of a columnar angle shape.
Figure 2C:
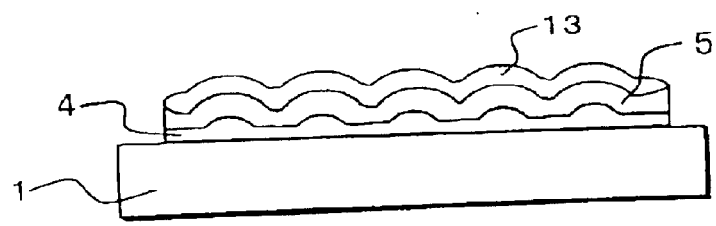
FIG. 2(c) is a sectional view taken on the chain line B—B. In these figures, 1 denotes a glass plate, 4 an innermost layer, 5 an intermediate layer, 12 an outermost layer having projections of a semispherical shape, and 13 an outermost layer having projections of a semi-cylindrical shape.

For enlarging the projections of the outermost layer to impart any of those functions to the multilayer-coated substrate, it is preferred to form lower layers having projections conforming to the shape of the outermost layer. An embodiment of this is shown in FIG. 1(c) or FIG. 2(c). By thus forming lower layers having projections, a multilayer-coated substrate having enlarged projections can be obtained without increasing the thickness of each layer. Namely, a multilayer-coated substrate can be produced in which the surface of each layer is prevented from cracking and, simultaneously therewith, the outermost layer has large projections.

It is preferred that projections be formed on each layer for this multilayer-coated substrate when it is provisionally molded to a gel state. This can be accomplished by forming recesses on the mold for each layer.

The provisionally molded layers in a gel state are superposed on each other. Thereafter, the superposed layers are pressed with the mold for the outermost layer and heated to solidify. Even when a multilayer substrate which as a whole is thick is to be formed, each of the individual layers to be superposed can have a reduced thickness. Consequently, each layer is less apt to have a difference in the progress of condensation polymerization reaction between the surface and an inner part thereof, so that a stress is less apt to generate. Namely, by superposing the layers in a gel state, the surface of each layer is made to less crack.

In the layers, the ratio of the thickness of the thickest layer to that of the thinnest layer, i.e., (thickness of the thickest layer)/(thickness of the thinnest layer), is preferably from 1 to 5. Here, the thickness of a layer means the thickness of the thickest part of the layer at the stage in which the solution or sol has been poured into a mold, i.e., the part D shown in FIG. 4(c). When that thickness ratio is within the range, the layers are less apt to differ from each other in the progress of condensation polymerization reaction in gelation and solidification. Consequently, since the thicknesses of the respective layers are within a narrow range, layers which are even throughout the whole multilayer-coated substrate can be produced. As a result, each layer is less apt to crack. More preferred values of that ratio are from 1 to 1.2. The most preferred value is 1. Namely, the most suitable are layers which all have the same thickness.

In the layers, the thickness of each layer is not particularly limited. However, it is preferably from 0.1 to 20 μm. In case where the thickness of each layer exceeds 20 μm, cracking becomes severe. In contrast, thicknesses thereof smaller than 0.1 μm pose a problem in production because it is difficult to form outermost and lower layers having projections.

Although the height of the projections of the outermost layer is not particularly limited, it is preferably from 0.1 to 40 μm. Here, the height of the protections is L in FIG. 3. The reasons for that range of the height are as follows. In case where the value thereof is smaller than 0.1 μm, the projections are less apt to perform their function. Specifically, in case where it is less than 0.1 μm, the multilayer-coated substrate, when used as an optical lens, shows reduced performance in the convergence or diffusion of light and is less apt to perform the function of a lens. In contrast, in case where the value thereof is larger than 40 μm, surface cracks are apt to generate during production.

The layers may consist of the same or different components. In the case where the layers consist of the same component(s), a multilayer-coated substrate having an even and thick coating layer can be obtained. In contrast, by modifying the component(s) of each layer, various properties can be imparted to the multilayer-coated substrate.

For example, by adding an oxide of a metal such as titanium, zirconium, aluminum, lead, or tantalum to an organopolysiloxane, the refractive index of the layer can be heightened. In contrast, a lowered refractive index can be attained by adding boron, fluorine, or the like to an organopolysiloxane. By thus changing the refractive index of each layer, the multilayer-coated substrate, when used as an optical part, can be freely regulated with respect to the property of converging or diffusing light.

Furthermore, by regulating the proportion of an organic functional group in an organopolysiloxane, a new function can be imparted to each layer. The organic functional group is methyl, ethyl, n-propyl, isopropyl, n-(β-aminoethyl)-γ-aminopropyl, phenyl, or chlorophenyl group, etc. For example, a layer made of an organopolysiloxane containing such an organic functional group in a high proportion by weight is less brittle and less apt to develop surface cracks than layers in which the weight proportion thereof is low. However, too high a weight proportion of an organic functional group results in impaired heat resistance of the multilayer-coated substrate. Consequently, the weight proportion of an organic functional group in an organopolysiloxane is preferably from 20 to 60% by weight.

In the multilayer-coated substrate, when the layers are made of different components as described above, the layers have different coefficients of linear expansion. It is preferred that the coefficients of linear expansion thereof gradationally change from the substrate toward the outermost layer. This is because by arranging the layers so that the coefficients of linear expansion change gradationally, the layers are made to be less apt to peel off even when this substrate is exposed to heat. Namely, the multilayer-coated substrate has enhanced heat resistance.

The difference in coefficient of linear expansion between any adjacent layers is preferably $\pm 5 \times 10^{-6}$ mm/° C. When the difference is within this range, the multilayer-coated substrate does not suffer interlaminar peeling even when heated to 300° C. Namely, this multilayer-coated substrate can withstand soldering.

The layers are preferably two layers. This is because the smaller the number of layers, the smaller the number of production steps.

Although the substrate is not particularly limited in kind, it is preferably a transparent body such as a glass. The multilayer-coated substrate having a transparent body as a substrate can perform the function of a lens or transmission type diffraction grating. In contrast, in the case of a multilayer-coated substrate employing an opaque substrate, it is suitable for use as a reflection type diffraction grating, a reflection type Fresnel reflector, or an information recording medium such as a CD-ROM. Examples thereof include aluminum substrates and the like.

Furthermore, in the case where the multilayer-coated substrate is for use as a lens or diffraction grating, it is preferred that the layers be made of different components so that their refractive indexes gradationally change from the innermost layer toward the outermost layer. For example, when the layers are arranged so that their refractive indexes gradationally increase from the innermost layer toward the outermost layer, the multilayer-coated substrate is more effective in converging light and gives a lens having enhanced light-converging performance. In addition, the stray light attributable to internal reflection is diminished and the light-resolving power is enhanced, whereby the multilayer-coated substrate as a diffraction grating has enhanced performances.

In the case where this multilayer-coated substrate is used as an optical element, it preferably satisfies the relationship $t_x/n_x = \lambda/4$, wherein $t_x$ is the thickness of an arbitrary layer, $n_x$ is the refractive index of the layer, and $\lambda$ is the wavelength of the light passing through the layer. A multilayer-coated substrate which satisfies this requirement is considerably reduced in internal light reflection. Consequently, a multilayer-coated substrate having layers satisfying the requirement can highly function as a lens or diffraction grating. In the case where the wavelength of light to be used has been fixed, the optimal values of the thickness and refractive index of each layer can be determined according to the equation.

Moreover, the multilayer-coated substrate preferably satisfies the relationship $$n_a/n_b = \sqrt{(n_s/n_o)}$$

wherein $n_a$ is the refractive index of the innermost layer, $n_b$ is the refractive index of an intermediate layer, $n_o$ is the refractive index of the outermost layer, and $n_s$ is the refractive index of the substrate. It is further preferred that this relationship be satisfied simultaneously with $n_a \geq n_b$. A multilayer-coated substrate which satisfies this relationship can remove the reflected light which cannot be eliminated with an antireflection coating generally deposited on surfaces of optical elements.

In the case where the multilayer-coated substrate is used as an optical element, the light to be used preferably has a wavelength of from 380 to 2,000 nm. Since visible light and infrared light are within that wavelength range, this multilayer-coated substrate has exceedingly high suitability for general-purpose use. In the case of visible light, this multilayer-coated substrate can therefore be used as a condenser lens for concentrating light upon the liquid-crystal window of a liquid-crystal projector. In the case of infrared light, the multilayer-coated substrate can be used as a coupling lens for coupling a laser or LED for communication to an optical fiber.

Each layer of the multilayer-coated substrate is not particularly limited in its material as long as it comprises an organopolysiloxane. It is, however, preferred that the outermost layer be one formed from methyltriethoxysilane and a lower layer be one formed from methyltriethoxysilane or tetraethoxysilane. Methyltriethoxysilane has an organic functional group in a relatively high weight proportion and is less apt to develop surface cracks during the provisional molding of a layer and solidification thereof. Namely, by using methyltriethoxysilane for an outermost layer, the reject rate for the multilayer-coated substrate can be reduced. The layer formed from methyltriethoxysilane further has satisfactory heat resistance because the proportion of Si—O bonds, i.e., covalent bonds, constituting the backbone is high. Consequently, a multilayer-coated substrate which is less apt to crack and has satisfactory heat resistance can be produced by using methyltriethoxysilane for both the outermost layer and a lower layer.

Furthermore, the degree of integration of the multilayer-coated substrate as a whole can be heightened by using methyltriethoxysilane for the outermost layer and using tetraethoxysilane for a lower layer. This is because in the case where a glass plate is used as the substrate, tetraethoxysilane is intermediate in properties between the glass plate and methyltriethoxysilane. The intermediate properties, specifically, are refractive index and coefficient of linear expansion. Namely, by forming a lower layer (tetraethoxysilane) which is intermediate in refractive index and coefficient of linear expansion between the substrate (glass plate) and the outermost layer (methyltriethoxysilane), the adhesion between the substrate and the lower layer and between the lower and outermost layers is improved and the degree of integration of the multilayer-coated substrate as a whole is heightened.

As described above, the invention is characterized by pouring a solution containing an organopolysiloxane on a substrate or into molds, separately molding the layers provisionally to a gel state, and superposing these gels and uniting the same with a substrate. The gels formed by provisional molding preferably have a viscosity in the range of from $1\times10^4$ to $1\times10^6$ P at the time of superposition. In the case where the viscosity thereof is within that range, the gels do not deform in the superposing operation but can be deformed by the subsequent pressing with the mold for the outermost layer In the process of the invention, layers in a gel state are superposed and then tightly bonded by pressing these layers with the mold for the outermost layer. Because of this, a space is less apt to be left between the substrate and a layer or between layers. This also is an advantage of the process of the invention.

As stated hereinabove, in the sol-gel method each layer preferably is thinner from the standpoint of preventing surface cracking. However, the multilayer-coated substrate should have large projections. This is because a multilayer-coated substrate having large projections can have a new performance. For example, when the multilayer-coated substrate is used as a lens array, the large projections enable the multilayer-coated substrate to have shortened focal distance.

It is therefore preferred that a lower layer also have projections conforming to the shape of the projections of the outermost layer from the standpoint of satisfying the conflicting requirements that the layers be thin and the projections be large. Examples of methods for forming projections on a lower layer include the method illustrated in FIG. 4 and FIG. 5. A feature of this method resides in a technique in which a solution of an organopolysiloxane is poured into a mold in such a small amount as to form depressions. By superposing these layers having depressions and projections, the requirements that the thickness of each layer be small and the projections be large can be satisfied.

The curing temperature at which the solution or sol is provisionally molded to a gel is preferably from 20 to 120° C. The reasons for this are as follows. In case of curing temperatures lower than 20° C., hydrolysis and condensation polymerization reaction are less apt to proceed. In case of curing temperatures higher than 120° C., the reaction proceeds so quickly that it is difficult to temporarily stop the reaction at the time when the layer is in a gel state. If the reaction at the time when the excessively in this provisional molding, the layers show reduced adhesion to each other, resulting in impaired heat resistance of the multilayer-coated substrate.

Thereafter, these gels are superposed and the superposed gels are united (solidified) with a substrate. The temperature in this operation is preferably from 50 to 150° C. This is because temperatures lower than 50° C. result in an exceedingly prolonged time period required for solidification, while temperatures higher than 150° C. are apt to result in cracking on the surface of each layer because the reaction proceeds rapidly.

EXAMPLES

The invention will be explained below in more detail by reference to Examples and Comparative Examples. However, the invention should not be construed as being limited to the following Examples.

The process for producing a multilayer-coated substrate is conducted roughly in the following order of procedure. (1) organopolysiloxane solutions are produced→(2) the solutions are applied to molds→(3) each layer is provisionally molded (gelation)→(4) the gels are superposed on a substrate→(5) the superposed gels are united with the substrate. The multilayer-coated substrates produced in this order of procedure were evaluated through various performance tests.

(Process for Producing Multilayer-coated Substrate)

(1) Organopolysiloxane solutions are produced:

With 14 g of ethanol was mixed 64 g of tetraethoxysilane. This solution was mixed with 22 g of dilute hydrochloric acid having a concentration of 0.2% by weight (solvent:water) to obtain 100 g of a tetraethoxysilane solution having a concentration of 64% by weight. This is referred to as solution 1.

Subsequently, 60 g of methyl triethoxysilane was mixed with 16 g of ethanol. This solution was mixed with 24 g of dilute hydrochloric acid having a concentration of 0.2% by weight (solvent:water) to obtain 100 g of methyltriethoxysilane solution having a concentration of 60% by weight. This is referred to as solution 2.

Furthermore, 26 g of titanium n-butoxide is mixed with 100 g of solution 1 to obtain $20TiO_2.80SiO_2$. This is referred to as solution 3.

(2) Solutions are applied to molds:

The solutions are applied to a substrate and molds.

Figure 4A:
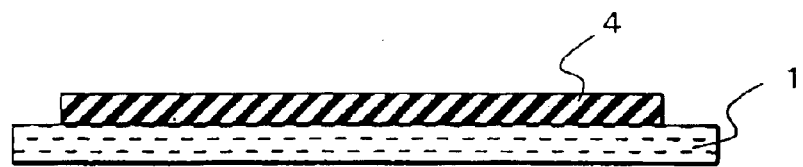
FIG. 4 (a) is a diagrammatic view illustrating the state in which a solution of an organopolysiloxane has been applied to a glass plate. In the figure, 1 denotes a glass plate and 4 an innermost layer.
FIG. 4(b) is a diagrammatic view illustrating the state in which a solution of an organopolysiloxane has been applied to an intermediately spherical mold. In the figure, 30 denotes an intermediately spherical mold (mold for an intermediate layer) and 5 an intermediate layer.

First, one of solutions 1 to 3 was applied to a glass plate 1 by the spin coating method in the manner shown in FIG. 4(a). The dip coating method may be used here in place of the spin coating method. The glass plate coated with the solution was naturally dried by allowing it to stand at room temperature (26° C.) for 30 minutes. The solution was regulated so as to have a desired thickness on the glass plate. This desired thickness varies depending on the kind of the solution for each layer. The thickness of each layer $t_x$ is calculated from the wavelength of He—Ne laser, $\lambda=0.63$ μm, and the refractive index $n_x$ of the solidified layer using $t_x=\lambda/4\times n_x$. This layer in contact with the glass plate is the innermost layer of a multilayer-coated substrate.

Figure 4B:
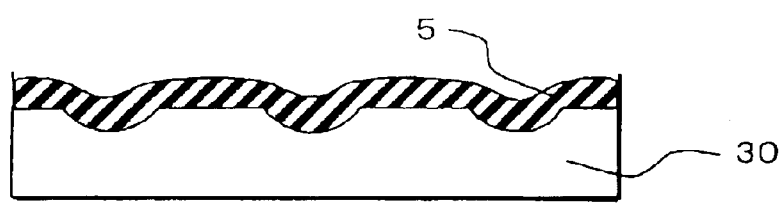
Figure 4C:
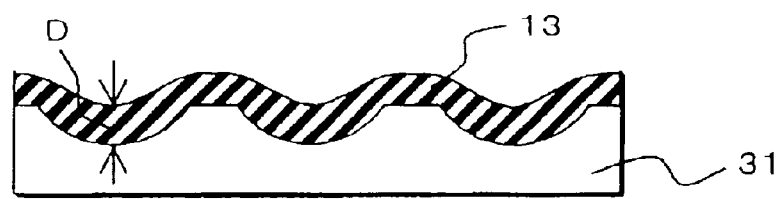

In the same manner, one of solutions 1 to 3 described above was applied to an outermost-layer mold by the spin coating method. The dip coating method may be used in place of the spin coating method as in the coating described above. This solution applied was naturally dried at room temperature (26° C.) for 30 minutes. As the outermost-layer mold were used two molds, i.e., a nickel mold having recesses of a nearly spherical arc shape having a radius of curvature of 50 μm and a depth of 25 μm (hereinafter referred to as a spherical mold) and a nickel mold having V-shaped grooves having a pitch of 4 μm, a depth of 2 μm, and an apex angle of 45° (hereinafter referred to as a V-grooved mold). The spherical mold is shown in FIG. 4(c).

The solution applied to the outermost-layer mold comes into the recesses of the mold to constitute the projections of the outermost layer of a multilayer-coated substrate.

An intermediate layer was formed so as to have projections which were smaller than the projections of the outermost layer and conformed to the shape of the projections of the outermost layer. Namely, the intermediate-layer mold has recesses so that the intermediate layer comes to have projections in the same positions as the projections of the outermost layer. In this Example, one intermediate layer is formed because a multilayer-coated substrate in which the coating is composed of three superposed layers is produced. Consequently, in the case where the outermost-layer mold was the spherical mold, a mold having recesses having a radius of curvature of 25 μm and a depth of 12.5 μm (hereinafter referred to as an intermediately spherical mold) was used as the intermediate-layer mold. This intermediately spherical mold is shown in FIG. 4(b). In the case where a larger number of intermediate layers are to be formed, the effects of the invention can be produced by using molds in which the recesses gradationally become larger from the substrate toward the outermost layer.

However, in the case where the outermost-layer mold is the V-grooved mold, the intermediate layer need not have projections because the V-shaped grooves are shallow. An intermediate layer having no projections has an advantage that it has better releasability. Consequently, a flat polycarbonate plate was used as an intermediate-layer mold in this Example when the V-grooved mold was used as an outermost-layer mold.

For forming an intermediate layer, one of solutions 1 to 3 was applied to the intermediately spherical mold or the polycarbonate plate by the spin coating method. This solution was naturally dried at room temperature (26° C.) for 30 minutes. The solution was regulated so as to result in a desired thickness.

(3) Each layer is provisionally molded:

The glass plate and molds to which a solution had been applied were placed in a vacuum chamber and heated to a given temperature under vacuum to conduct provisional molding. The back pressure at the time of the provisional molding was $1\times10^{-4}$ mmHg and the time period was 30 minutes. The temperature for the provisional molding was 50° C. in the case of solution 1 or solution 3 and was 80° C. in the case of solution 2, from the standpoint of preventing cracking. These conditions for provisional molding were selected so that optimal conditions were used for each layer. The viscosity of each gel was regulated to $1\times10^4$ P.

(4) Gels are superposed on substrate:

The intermediate-layer gel was released from the mold and superposed on the innermost-layer gel on the glass plate. Furthermore, the outermost-layer gel which was still in the mold was brought into contact with the superposed gels.

(5) Superposed gels are united with substrate:

The outermost-layer gel and the superposed gels were heated under vacuum while pressing these gels with the outermost-layer mold. Thus, main molding was conducted. The back pressure at the time of the main molding was $1\times10^{-4}$ mmHg and the time period for the main molding was 120 minutes. The pressing pressure for the outermost layer was from 2 to 2.5 kgf/cm². Furthermore, the temperature was 80° C. in the case of solution 1 or 3 and was 120° C. in the case of solution 2.

(Performance Evaluation of Multilayer-coated Substrate)

(Measurement of Dispersion of Projection Height)

A 10 mm-square sample was arbitrarily taken out from the surface of the outermost layer of the multilayer-coated substrate, and the heights of the projections were measured with a laser microscope.

(Heat Resistance Test)

The multilayer-coated substrate was held at 300° C. for 2 hours and then cooled to room temperature. This coated substrate was visually examined for cracks or interlaminar peeling.

(Measurements of Optical Properties)

Before and after the heat resistance test, a He—Ne laser was used to determine the diffraction pattern of a diffraction grating and the converging performance of microlenses and to examine the changes thereof. Furthermore, a He—Ne laser was used to irradiate a substrate surface with the laser light at an incident angle of about 6°. From the total reflection amount, the value of Fresnel reflection on the substrate surface was calculated. This calculated value was subtracted to calculate the amount of reflection within the substrate, and the change of the internal reflection amount was evaluated. Furthermore, an Abbe's refractometer was used to measure the refractive index of d-line in a mold flat part, and the change thereof was evaluated.

Example 1

Solution 1 was applied to each of a soda-lime glass plate (substrate), a polycarbonate plate (intermediate-layer mold), and a V-grooved mold (outermost-layer mold) in such an amount as to result in a thickness of 2 μm after solidification, and then provisionally molded. The 2 μm on the V-grooved mold is for the thickest part of the gel after the provisional molding; that part is indicated by D in FIG. 4(c). In main molding, the pressing pressure applied with the V-grooved mold was 2 kgf/cm².

The multilayer-coated substrate produced under these conditions was transparent. The thickness of the layers was 6 μm, and the refractive index was 1.39. This multilayer-coated substrate is utilizable as a diffraction grating. In this multilayer-coated substrate, the projections had a dispersion of height of 0.7 μm. As a result of the heat resistance test, this multilayer-coated substrate underwent neither cracking nor interlaminar peeling. Furthermore, as a result of the optical property measurements, no change was observed in diffraction pattern, amount of internal reflection, and refractive index.

Incidentally, in this multilayer-coated substrate, the interfaces between superposed gels could not be recognized because the layers consisted of the same component. Namely, all the layers had been united with each other.

Example 2

Figure 5D:
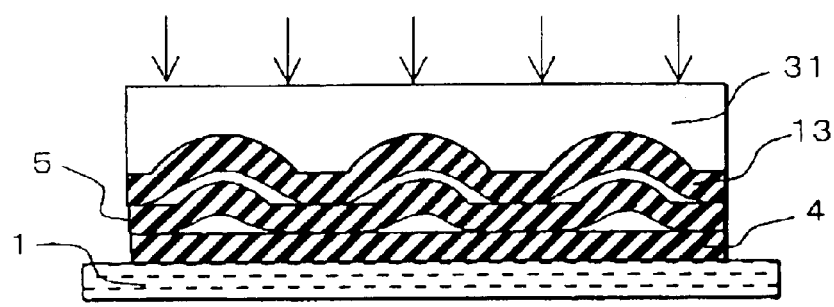
FIG. 5(d) is a diagrammatic view illustrating provisionally molded gels which have been superposed and are being subjected to main molding. In the figure, 1 denotes a glass plate, 4 an innermost layer, 5 an intermediate layer, 13 an outermost layer having projections of a semi-cylindrical shape, and 31 a spherical mold (mold for the outermost layer).
Figure 5E:
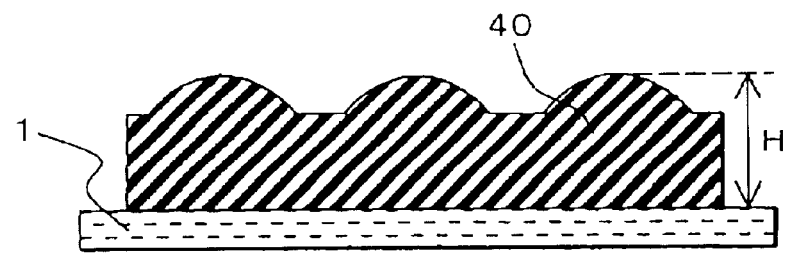
FIG. 5(e) is a sectional view of a multilayer-coated substrate having layers which have been united together through main molding. In the figure, 1 denotes a glass plate and 40 united layers, and H is the thickness of the united layers.

Solution 2 was applied to each of a soda-lime glass plate, an intermediately spherical mold, and a spherical mold in such an amount as to result in a thickness of 17 μm after solidification, and then provisionally molded. The 17 μm is the thickness of the thickest part of the gel after the provisional molding. In main molding, the pressing pressure applied with the spherical mold was 2.5 kgf/cm². The steps of producing a multilayer-coated substrate in Example 2 are shown in FIG. 4 and FIG. 5.

The multilayer-coated substrate produced under these conditions was transparent. The thickness of the layers was 50 μm, and the refractive index was 1.45. The term thickness of the layers means H in FIG. 5(e). This multilayer-coated substrate functioned as microlenses, whose focal distance was 105 μm. In this multilayer-coated substrate, the projections had a dispersion of height of 0.4 μm. As a result of heat resistance test, this multilayer-coated substrate underwent neither cracking nor interlaminar peeling. As a result of the optical property measurements, no change was observed in converging performance, amount of internal reflection, and refractive index.

Incidentally, in this multilayer-coated substrate, the interfaces between superposed gels could not be recognized because the layers consisted of the same component. Namely, all the layers had been united with each other.

Example 3

Solution 3 was applied to an optical glass plate having a refractive index of 1.70 in such an amount as to result in a thickness of 0.24 μm after solidification. Furthermore, solution 1 was applied to a polycarbonate plate in such an amount as to result in a thickness of 2 μm after solidification. These solutions applied were provisionally molded separately. Neither of the outermost-layer molds, i.e., the spherical mold and the V-grooved mold, was used in Example 3, as different from Example 1 and Example 2. Consequently, the multilayer-coated substrate to be produced had two superposed layers on the optical glass plate. In main molding, the polycarbonate plate was pressed against the optical glass plate at a pressure of 2 kgf/cm². Thus, a multilayer-coated substrate was produced.

In the multilayer-coated substrate produced under these conditions, the thickness of the layers was 2 μm. As a result of the heat resistance test, the multilayer-coated substrate underwent neither cracking nor interlaminar peeling. Among the optical property measurements, only the measurement of the amount of internal reflection was conducted. As a result, the amount of internal reflection was 0.1% or smaller, and this value did not change through heating.

The conditions and results in Examples 1 to 3 are summarized in Table 1 below.

| Item | Example 1 | Example 2 | Example 3 |
| --- | --- | --- | --- |
| Outermost-layer mold | V-grooved mold | spherical mold | — |
| Thickness of layers (μm) | 6 | 50 | 2 |
| Refractive index | 1.39 | 1.45 | 1.51 |
| Pressing pressure (kgf/cm²) | 2 | 2.5 | 2 |
| Dispersion of projections (μm) | 0.7 | 0.4 | — |
| Heat resistance test | no change | no change | no change |
| Optical property | no change | no change | no change |

The Examples given above show the following. The multilayer-coated substrates according to the invention, which each has layers comprising an organopolysiloxane, have high heat resistance and do not undergo a performance change such as discoloration or interlaminar peeling.

Industrial Applicability

Since the invention has the constitutions described above, it produces the following effects.

According to the multilayer-coated substrate of the invention described in item 1 above, since it comprises a substrate and united therewith two or more superposed layers which comprise an organopolysiloxane and the outermost layer of which has projections, which have a dispersion of height of 1 μm or less, an information recording medium and an optical part each having high performances can be obtained.

According to the multilayer-coated substrate of the invention described in item 2 above, since the projections of the outermost layer have at least one sectional shape selected from the group consisting of a circular arc, an elliptic arc, and an angle, the multilayer-coated substrate can be used in various applications, in addition to the effect of the invention described in item 1 above.

According to the multilayer-coated substrate of the invention described in item 3 above, since a lower layer also has projections conforming to the projections of the outermost layer, each layer can be prevented from cracking, in addition to the effect(s) of the invention described in item 1 or 2 above.

According to the multilayer-coated substrate of the invention described in item 4 above, since the ratio of the thickness of an arbitrary layer to that of another is from 1 to 5, the layers are alike in properties and, hence, cracking can be inhibited more effectively, in addition to the effect(s) of the invention described in any one of items 1 to 3 above.

According to the multilayer-coated substrate of the invention described in item 5 above, since the coefficients of linear expansion of the respective layers change gradationally from the substrate toward the outermost layer, the multilayer-coated substrate can have a heightened degree of integration, in addition to the effect(s) of the invention described in any one of items 1 to 4 above.

According to the multilayer-coated substrate of the invention described in item 6 above, since the superposed layers are two layers, the production steps can be shortened, in addition to the effect(s) of the invention described in any one of items 1 to 5 above.

According to the multilayer-coated substrate of the invention described in item 7 above, since the substrate is a transparent body, the multilayer-coated substrate can be used as a high-performance optical part, in addition to the effect(s) of the invention described in any one of items 1 to 6 above.

According to the multilayer-coated substrate of the invention described in item 8 above, since the two or more layers gradationally change in refractive index from the substrate toward the outermost layer, the performances of the multilayer-coated substrate as an optical part can be further heightened, in addition to the effects of the invention described in item 7 above.

According to the multilayer-coated substrate of the invention described in item 9 above, since it satisfies the relationship $$t_x/n_x = \lambda/4$$

wherein $t_x$ is the thickness of an arbitrary layer, $n_x$ is the refractive index thereof, and $\lambda$ is the wavelength of the transmitted light, the internal reflection of the multilayer-coated substrate can be prevented, in addition to the effects of the invention described in item 7 or 8 above.

According to the multilayer-coated substrate of the invention described in item 10 above, since it satisfies the relationship $$n_x/n_b = \sqrt{(n_s/n_o)}$$

wherein $n_o$ is the refractive index of the outermost layer, $n_b$ is the refractive index of an intermediate layer, $n_a$ is the refractive index of the innermost layer, and $n_s$ is the refractive index of the substrate, the internal reflection of the multilayer-coated substrate can be prevented more effectively, in addition to the effects of the invention described in item 9 above.

According to the multilayer-coated substrate of the invention described in item 11 above, since the transmitted light has a wavelength of from 380 to 2,000 nm, the multilayer-coated substrate can be used as an optical part in a wide range, in addition to the effects of the invention described in item 9 or 10 above.

According to the multilayer-coated substrate of the invention described in item 12 above, since the outermost layer has been formed from methyltriethoxysilane and a lower layer has been formed from methyltriethoxysilane or tetraethoxysilane, the multilayer-coated substrate can have enhanced heat resistance and a heightened degree of integration, in addition to the effect(s) of the invention described in any one of items 1 to 10 above.

According to the process for producing a multilayer-coated substrate of the invention described in item 13 above, since it comprises pouring a solution of an organopolysiloxane on a substrate and into molds, separately causing the solution layers to gel, subsequently superposing these gels on the substrate, and uniting the superposed gel layers with the substrate while pressing the gels with the mold for the outermost layer, a multilayer-coated substrate in which the projections of the outermost layer have high dimensional accuracy can be produced while preventing each layer from developing surface cracks.

According to the process for producing a multilayer-coated substrate of the invention described in item 14 above, since an arbitrary layer is formed with a mold with which the layer is made to have the shape as described in item 2 or 3 above, a multilayer-coated substrate in which the outermost layer has large projections can be produced, in addition to the effect of the invention described in item 13 above.

According to the process for producing a multilayer-coated substrate of the invention described in item 15 above, since the temperature at which the organopolysiloxane solution is caused to gel is from 20 to 120° C. and the temperature at which the superposed gel layers are united with the substrate thereafter is from 50 to 150° C., a multilayer-coated substrate can be efficiently produced while preventing each layer from cracking, in addition to the effect(s) of the invention described in item 13 or 14 above.

According to the process for producing a multilayer-coated substrate of the invention described in item 16 above, since the gels to be superposed have a viscosity of from $1 \times 10^4$ to $1 \times 10^6$ P, the gels do not deform during superposition and a multilayer-coated substrate in which the substrate and the layers are tightly bonded to each other can be easily produced, in addition to the effect(s) of the invention described in any one of items 13 to 15 above.

What is claimed is:

1. A multilayer-coated substrate comprising a substrate and united therewith two or more superposed layers which comprise an organopolysiloxane and the outermost layer of which has projections, the projections having a dispersion of height of 1 μm or less, wherein a weight proportion of an organic functional group in the organopolysiloxane ranges from 20 to 60% by weight.

2. The multilayer-coated substrate of claim 1, wherein the projections of the outermost layer have at least one sectional shape selected from the group consisting of a circular arc, an elliptic arc, and an angle.

3. The multilayer-coated substrate of claim 1 or 2, wherein a lower layer also has projections conforming to the projections of the outermost layer.

4. The multilayer-coated substrate of claim 1 or 2, wherein in the two or more layers, the ratio of the thickness of the thickest layer to that of the thinnest layer is from 1 to 5.

5. The multilayer-coated substrate of claim 1 or 2, wherein in the two or more layers, the coefficients of linear expansion of the respective layers change gradationally from the substrate toward the outermost layer.

6. The multilayer-coated substrate of claim 1 or 2, wherein the two or more layers are two layers.

7. The multilayer-coated substrate of claims 1 or 2, wherein in the two or more layers, the outermost layer has been formed from methyltriethoxysilane and a lower layer has been formed from methyltriethoxysilane or tetraethoxysilane.

8. The multilayer-coated substrate of claim 1 or 2, wherein the substrate is a transparent body.

9. The multilayer-coated substrate of claim 8, wherein the two or more layers gradationally change in refractive index from the substrate toward the outermost layer.

10. The multilayer-coated substrate of claim 9, wherein the two or more layers satisfy the relationship $$t_x/n_x = \lambda/4$$

wherein $t_x$ is the thickness of an arbitrary layer, $n_x$ is the refractive index thereof, and $\lambda$ is the wavelength of the transmitted light.

11. The multilayer-coated substrate of claim 8, wherein the two or more layers satisfy the relationship $$t_x/n_x = \lambda/4$$

wherein $t_x$ is the thickness of an arbitrary layer, $n_x$ is the refractive index thereof, and $\lambda$ is the wavelength of the transmitted light.

12. The multilayer-coated substrate of claim 11, wherein the transmitted light has a wavelength of from 380 to 2,000 nm.

13. The multi-layer coated substrate of claim 11, wherein the two or more layers satisfy the relationship $$n_a/n_b = \sqrt{(n_s/n_o)}$$

wherein $n_o$ is the refractive index of the outermost layer, $n_b$ is the refractive index of an intermediate layer, $n_a$ is the refractive index of the innermost layer, and $n_s$ is the refractive index of the substrate.

14. The multilayer-coated substrate of claim 13, wherein the transmitted light has a wavelength of from 380 to 2,000 nm.

* * * * *